United States Patent [19]

Brinsmead et al.

[11] Patent Number: 5,114,568
[45] Date of Patent: May 19, 1992

[54] RECLAMATION SYSTEM FOR CONTAMINATED MATERIAL

[75] Inventors: Brian J. Brinsmead; Gary F. Stepenoff, both of Scottsdale; Vicki H. Bess, Tempe; Gary R. Huxel, Phoenix; John A. Wetmore, Mesa, all of Ariz.

[73] Assignee: Earth Solutions, Inc., Tempe, Ariz.

[21] Appl. No.: 553,536

[22] Filed: Jul. 13, 1990

[51] Int. Cl.$^5$ .................. B03D 1/14; B03D 1/24; B04C 3/04; B04C 3/06

[52] U.S. Cl. .................. 209/170; 209/164; 209/211; 210/703; 210/787; 210/788; 210/789; 210/221.2; 210/512.1; 210/512.3; 210/512.2; 210/241; 208/425; 196/14.52

[58] Field of Search .......... 209/615, 170, 211; 210/241, 512.3, 512.2, 512.1, 221.2, 751, 703, 787, 788, 789; 208/425; 196/14.52

[56] References Cited

U.S. PATENT DOCUMENTS

| 994,497 | 6/1911 | Berrigan | 209/168 |
|---|---|---|---|
| 1,374,447 | 4/1921 | Greenwalt | 209/169 |
| 1,420,138 | 6/1922 | Peck | 209/170 |
| 2,174,540 | 10/1939 | Wallace | 209/169 |
| 2,246,559 | 6/1941 | Weinig | 209/169 |
| 3,434,598 | 3/1969 | Daman | 209/169 |
| 3,784,464 | 1/1974 | Kaminsky | 209/169 |
| 4,094,783 | 6/1978 | Jackson | 209/170 |
| 4,214,982 | 7/1980 | Pfalzer | 209/170 |
| 4,279,743 | 7/1981 | Miller | 209/211 |
| 4,336,136 | 6/1982 | Giguere | 210/221.2 |
| 4,397,741 | 8/1983 | Miller | 209/170 |
| 4,399,027 | 8/1983 | Miller | 209/164 |
| 4,424,081 | 1/1984 | Giguere | 134/10 |
| 4,620,671 | 11/1986 | Skaar | 209/170 |
| 4,744,890 | 5/1988 | Miller | 209/164 |
| 4,783,263 | 11/1988 | Trost | 210/705 |
| 4,838,434 | 6/1989 | Miller | 209/164 |
| 4,923,125 | 5/1990 | Bateman | 241/24 |
| 4,971,685 | 11/1990 | Stanley | 209/170 |
| 4,997,549 | 3/1991 | Atwood | 209/170 |
| 5,019,245 | 5/1991 | Ignasiak | 210/704 |

FOREIGN PATENT DOCUMENTS

| 198737 | 3/1985 | European Pat. Off. | 209/170 |
|---|---|---|---|
| 2812105 | 9/1979 | Fed. Rep. of Germany | 209/170 |
| 2539772 | 7/1984 | France | 209/170 |
| 545385 | 3/1977 | U.S.S.R. | 209/170 |
| 751437 | 7/1980 | U.S.S.R. | 209/170 |
| 789397 | 12/1980 | U.S.S.R. | 209/170 |
| 1472132 | 4/1989 | U.S.S.R. | 209/170 |
| 2102308 | 2/1983 | United Kingdom | 209/170 |
| 2148139 | 5/1985 | United Kingdom | 209/170 |

OTHER PUBLICATIONS

"Technical Bulletin No. 88-2, Biotrol".
"Experience with the Harbauer PB3 Soil Cleaning System" by H. D. Sonnen, W. Groschel, M. Nels.

Primary Examiner—Ivars Cintins
Assistant Examiner—Thomas M. Lithgow
Attorney, Agent, or Firm—Anthony Durando; Harry M. Weiss

[57] ABSTRACT

A soil reclamation system that separates the contaminant from all soil particles greater than one micron in diameter and generates resuable soil and contaminant products. The process is based on a novel application of gas-sparged centrifugal separation under operating conditions and equipment specifications tailored to optimize the separation of the particular contaminant. The apparatus is mounted on a front-end loader for mobility and self-contained on site operation.

21 Claims, 3 Drawing Sheets

RECLAMATION SYSTEM FOR CONTAMINATED MATERIAL

BACKGROUND OF THE INVENTION

1. Field of the Invention

This invention pertains to the general field of reclamation of contaminated materials. In particular, it provides a new method and apparatus for the treatment of contaminated soil by breaking up and recovering the contaminant from the soil particles in a process employing a novel application of gas-sparged centrifugal field separation.

2. Description of the Prior Art

The ever increasing use of chemicals and chemical processing around the world to satisfy our civilization's appetite for comfort and goods produces a continuous output of contaminated materials that have to be reckoned with in an environmentally safe and economically feasible manner. Historically, contaminated materials have been treated as waste and stored permanently in landfills and similar dump sites. In recent years, though, we have come to recognize the environmental hazards associated with the unchecked use of the body of the earth as a permanent waste repository. We have discovered that underground water reservoirs can be contaminated by seepage and that the atmosphere can be polluted by evaporation. We have also been forced to accept the physical limitations involved with the disposal of huge amounts of waste in dedicated sites scattered around the planet. Finally, we have begun to appreciate the value of some of the materials discarded and the potential for recycling them into productive uses.

Accordingly, during the last couple of decades there has existed a tremendous impetus for developing commercial equipment for the reclamation of contaminated material. In particular, several technologies have been commercialized to reclaim soil contaminated by chemicals used in petroleum refining and other industrial activities. These chemicals include, for example, petroleum hydrocarbons such as diesel and other fuels, polycyclic aromatic hydrocarbons (PAH's), halogenated solvents, polychlorinated biphenols (PCB's), toxiphenes, and pesticides.

One often used remediation technology involves incineration of the contaminated soil in order to free it from the contaminant particles, which are burnt away. This process requires large amounts of energy to carry out the combustion and retains the problem of air quality control associated with the production of incineration exhausts and residues. As a result, the process is very expensive and not cost effective for most applications involving large amounts of contaminated soil.

An alternative remediation method is based on in situ biological treatment of the contaminated soil. The contaminant is exposed to bacteria and other agents that produce chemical changes and result in its ultimate elimination. Thus, relatively clean soil is left at the end of the process. This method is normally slow and requires long treatment periods to achieve satisfactory decontamination, resulting in prolonged environmental exposure and monitoring requirements. In addition, the method can be ineffective for soils containing high levels of toxic organic pollutants.

Recently developed technologies have utilized known unit operations from the mineral processing industry to separate and recover the soil from the contaminant. For example, a process developed by the German company Harbauer and marketed under the trademark "Harbauer PB3" is capable of cleaning contaminated soil and rubble to the point that the cleaned material can be refilled on site for normal use. The contaminant is washed out of the polluted material in an extraction unit that utilizes mechanical energy to break up the bonds between the contaminant and the soil particles, so that the contaminant can be entrained in a liquid extraction phase, generally water. This liquid extraction phase is then concentrated to recover reusable water through several steps involving oil separation, flotation, desorption, and filtration and adsorption over activated carbon. The resulting contaminant sludge, which also contains all soil particles up to 15 microns in diameter, is disposed of in landfills as non-recoverable waste. The decontaminated soil is also concentrated through several dewatering steps involving traditional hydrocyclone separation and is delivered as a reusable output. Thus, this process reclaims polluted soil particles of sizes greater than 15 microns, but leaves smaller soil and contaminant particles as non-recyclable waste.

Another recent development in the area of soil remediation is the technology marketed under the trade mark "BSTS" by the U. S. company Biotrol. The process is centered around a countercurrent scrubbing system that uses water as the separation medium. The scrubbing process consists of a number of screening, attrition, classification, froth flotation, and dewatering steps. In addition, a biological water treatment process is used to degrade the contaminants in the wash water from the soil scrubbing unit to nondetectable levels. In test runs where this process has been applied to soil contaminated with wood preservative, up to 95 percent of the contaminant was removed.

It is apparent from the foregoing that all such processes involve multistage unit operations requiring relatively large, sophisticated and expensive treatment plants. Therefore, there is a need for a simpler decontamination process that can be carried out on portable equipment in an efficient and cost effective manner. The present invention addresses this need and utilizes a novel approach to gas-sparged centrifugal classification to achieve the desired results.

In particular, this invention discloses a new method and apparatus founded on the well established principle of cyclone phase separation. When a suspension of solid particles in a fluid is fed tangentially into the top of a conical chamber, it acquires a spinning trajectory and the tangential velocity of the particles tends to carry them toward the periphery of the chamber. The result is a downward spiral path of increasing radius until the particles reach the boundary. The particles then continue their spiraling descent down the wall while the fluid moves upward in the central core. Because at high tangential velocities the outward force on a particle is many times greater than the force of gravity, cyclones accomplish more rapid and effective separation than gravitational settling chambers.

When the particles in the feed to a cyclone vary in size, the heavier particles have greater kinetic energy for a given tangential velocity and, therefore, reach the boundary more quickly than the lighter particles. By appropriately designing its geometry and operating conditions, a cyclone can thus be used to separate particles by size. When the fluid in the feed is liquid, this separation can be further aided by the technique of sparging gas bubbles into the cyclone vortex from the interior of the cyclone wall. It has been found that these bubbles tend to create turbulence at the boundary layer with the liquid in the vortex, thereby increasing the probability of collisions with particles in suspension, the lighter fraction of which adheres to and is entrained by the bubbles to form a foam that migrates to the center of the cyclone because of its relatively lighter weight. Therefore, gas sparging enhances the classification properties of cyclones.

In U.S. Pat. No. 4,279,743 (1981), Miller describes a hydrocyclone incorporating an air sparging system to improve or control the size separation of particles present in the feed. This hydrocyclone can also be used to separate hydrophobic particles from hydrophilic particles in the centrifugal field. The feed slurry is pumped tangentially into the top portion of the apparatus according to traditional cyclone operation and air bubbles are introduced from the wall midway down the chamber.

U.S. Pat. No. 4,397,741 to Miller (1983) teaches the use of air injection in a centrifugal field to provide flotation to separate solid particles from a fluid. Instead of a traditional cyclone construction, the apparatus consists of a cylindrical vessel with a tangential inlet and a tangential outlet. The particulate suspension swirls around the inner surface of the vessel and air is sparged into it through a porous wall. Because of the high probability of collision between the air bubbles and the particles in suspension, relatively light bubble/particle aggregates are formed that migrate toward the center of the vessel where they are collected in the form of a froth.

In U.S. Pat. No. 4,399,027 (1983), Miller applies the air sparging technique to achieve satisfactory flotation in known hydrocyclone apparatus. Several configurations are described to embody the invention for various types of hydrocyclones.

In U.S. Pat. No. 4,744,890 (1988), Miller et al. illustrate another gas-sparged flotation apparatus to separate particles from mineral ore slurries. The device includes a cylindrical vessel having a tangential inlet at its upper end and an annular outlet at its lower end. The annular outlet permits the smooth exit of the fluid discharged from the flotation vessel in order to avoid disturbance of fluid flow within the vessel itself. The vessel includes an adjustable froth pedestal at its lower end to support the froth column formed by the gas sparged into the swirling slurry and to isolate the column from the fluid discharge.

Finally, U.S. Pat. No. 4,838,434 (1988) to Miller et al. shows further improvements in air sparged hydrocyclone flotation resulting from equipping the vessel with generally conical froth pedestals. These new configurations produce increased flotation yields, particularly in the recovery of fines from coal beneficiation processes.

Thus, while the prior art teaches us several principles of general application in the beneficiation of materials, it has not produced a technology for the practical reclamation of contaminated soil. Therefore, there exists a need for affordable soil remediation apparatus that can be used on site, is capable of a commercially viable throughputs, and is based on an environmentally acceptable process.

SUMMARY OF THE INVENTION

One of the objectives of this invention is the reclamation of contaminated soil on site, so as to avoid the material handling costs involved with transporting the soil to a central processing plant. This is achieved by having a self-contained system on a vehicle.

Another objective of the invention is the reduction of the capital and operating costs of reclamation. This is accomplished by an ingenious combination of known technology to produce a relatively small and mechanically simple piece of equipment to obtain the desired result.

A further goal of the invention is the improvement of soil decontamination beyond the limits of current technology, which has not yet produced an economic method of cleaning soil particles smaller than approximately 15 microns in diameter. To that end, the method of this invention has successfully produced complete reclamation of all soil particles greater than one micron in diameter.

Still another objective of the invention is the economic reclamation of large quantities of contaminated soil. Accordingly, it has been perfected for a throughput of about 150 tons per day, with a reasonable potential for increases up to about 800 tons per day.

Yet another objective o the invention is that it be environmentally sound. Therefore, every output stream of the process is produced in recyclable quality and only very small amounts of waste are left for disposal.

Finally, an objective of this invention is the realization of the above mentioned goals in an economical and commercially viable manner. This is done by utilizing components that are either already available in the open market or can be produced at competitive prices.

According to the foregoing objectives, this invention describes a soil reclamation system that separates the contaminant from all soil particles greater than one micron in diameter and generates reusable soil and contaminant products. The process is based on a novel application of gas-sparged centrifugal separation under operating conditions and equipment specifications tailored to optimize the separation of the particular contaminant. The apparatus is mounted on a front-end loader for mobility and self-contained on site operation.

Various other purposes and advantages of this invention will become clear from its description in the specifications that follow, and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

BRIEF DESCRIPTION OF THE DRAWING

FIG. 4b illustrates an enlarged view of a portion of the scrubber shown in FIG. 4a.

FIG. 5 is a cross-sectional view of the wall of the scrubber according to this invention as seen from line 5—5 in FIG. 4a.

FIG. 6 is a cross-sectional view of the scrubber of this invention as seen from line 6—6 in FIG. 4a.

DETAILED DESCRIPTION OF THE INVENTION

Figure 1:
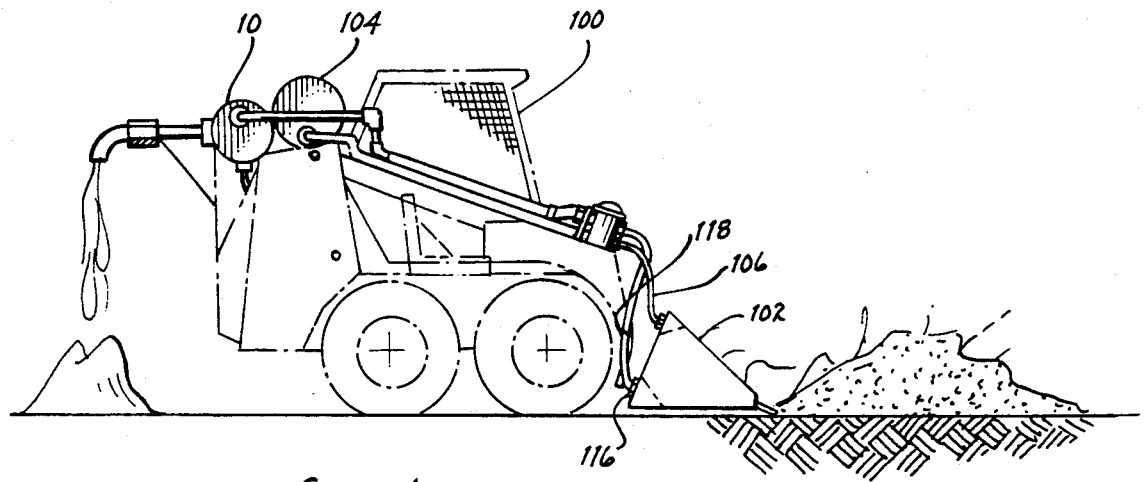
FIG. 1 illustrates an embodiment of this invention wherein the soil reclamation equipment is incorporated into a front end loader for on site operation.

The heart of this invention lies in the fact that several known principles have been combined in a novel arrangement incorporated in a compact and relatively inexpensive apparatus to achieve results heretofore unattained in the soil reclamation field. While the invention is described here in the context of remediation of contaminated soil, it is anticipated that the same technology can be used to separate contaminants from any solid medium that consists of a loose particle aggregate.

Experimental tests have shown that when soil is polluted with discharges of liquid chemicals, such as diesel fuel or PCB, the contaminant phase tends to adhere to the smaller soil particle sizes while leaving the larger sizes virtually uncontaminated. Thus, if the soil is broken up by mechanical forces into its constituent particles and these are fractionated by size, the contaminant will be found mostly attached to the smaller sizes, while the larger soil particles either will be left clean or will be easily decontaminated by simple separation procedures. It has also been found that the contaminant tends to form pockets trapped between layers of soil. Therefore, when the soil is broken up, the contaminant in these pockets is free to separate from the soil altogether. Since the contaminant is generally lighter than soil, it will then also be found with the smaller soil particles in the separation process.

Since the contaminants most commonly found in soil, as well as other debris in it, have a lower specific gravity than soil itself, the principle of centrifugal classification was adopted in the development of this invention to separate them from the soil. In addition, because most such contaminants have hydrophobic characteristics and are easily attached to gas bubbles to form an even lighter foam, the principle of gas sparging was incorporated into the process to enhance the classification of the contaminated soil into its constituent components.

Moreover, we introduced a new concept in hydrocyclone operation that enabled us to achieve greater separation of the soil and contaminant particles. Instead of creating a vortex by tangentially feeding the cylindrical or conical interior of the cyclone at relatively high velocity, we introduced a rotating medium in the cyclone chamber itself which by friction causes the fluid in the cyclone to spin outwardly and swirl toward lower pressure areas, thus forming a vortex equivalent in shape and function to the one formed by a tangential feed. This enabled us to position the feed to the apparatus at the center of the vortex, the area of minimum tangential velocity. Thus, the feed becomes part of the vortex from the center core and the particles suspended in it migrate toward the outside as a result of the forces imparted on them by the spinning fluid. This is opposite to the normal cyclone operation where the particles in the feed, by their high tangential velocity, form the vortex itself. The significance of this difference is that the separation of lighter particles from heavier particles in this invention occurs primarily by migration of the heavier particles from the center to the periphery of the cyclone, while in tangential feed apparatus the separation occurs primarily by replacement and migration of the lighter particles from the periphery to the center of the swirling fluid. This difference yields significantly better separation because the forces acting on suspended particles at a given tangential velocity are proportional to the particle mass and are, therefore, greater for heavier particles, which rapidly migrate to the wall of the cyclone. The lighter particles, on the other hand, are already around the center of the cyclone, where they tend to remain because of their low tangential velocity and low density.

Figure 5:
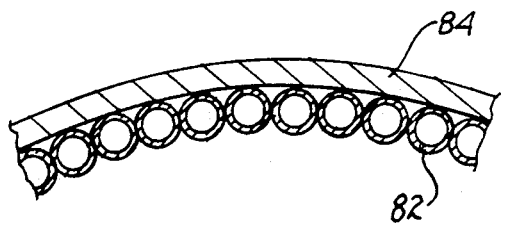

It is to be noted that the axial feed adopted by this invention is significantly different in function from the apparatus shown in the embodiment of FIG. 5 in U.S. Pat. No. 4,399,027 cited above. The cyclonic action in that invention is generated by a separate wash fluid introduced tangentially into the vessel, whereby the heavier particles are washed away in that fluid and the lighter particles are left and withdrawn as product in the feed fluid. The two fluids do not mix and are discharged from separate outlets.

As mentioned, the separation according to this invention is further improved by sparging gas into the spinning fluid inwardly from the wall of the cyclone apparatus. As gas is liberated through a porous medium, it forms a layer of bubbles that collide and become attached to the lighter particles in the fluid, namely the contaminant and the smallest soil particles, which then form a low density foam that is displaced toward the center of the vortex by the heavier material.

Figure 4A:
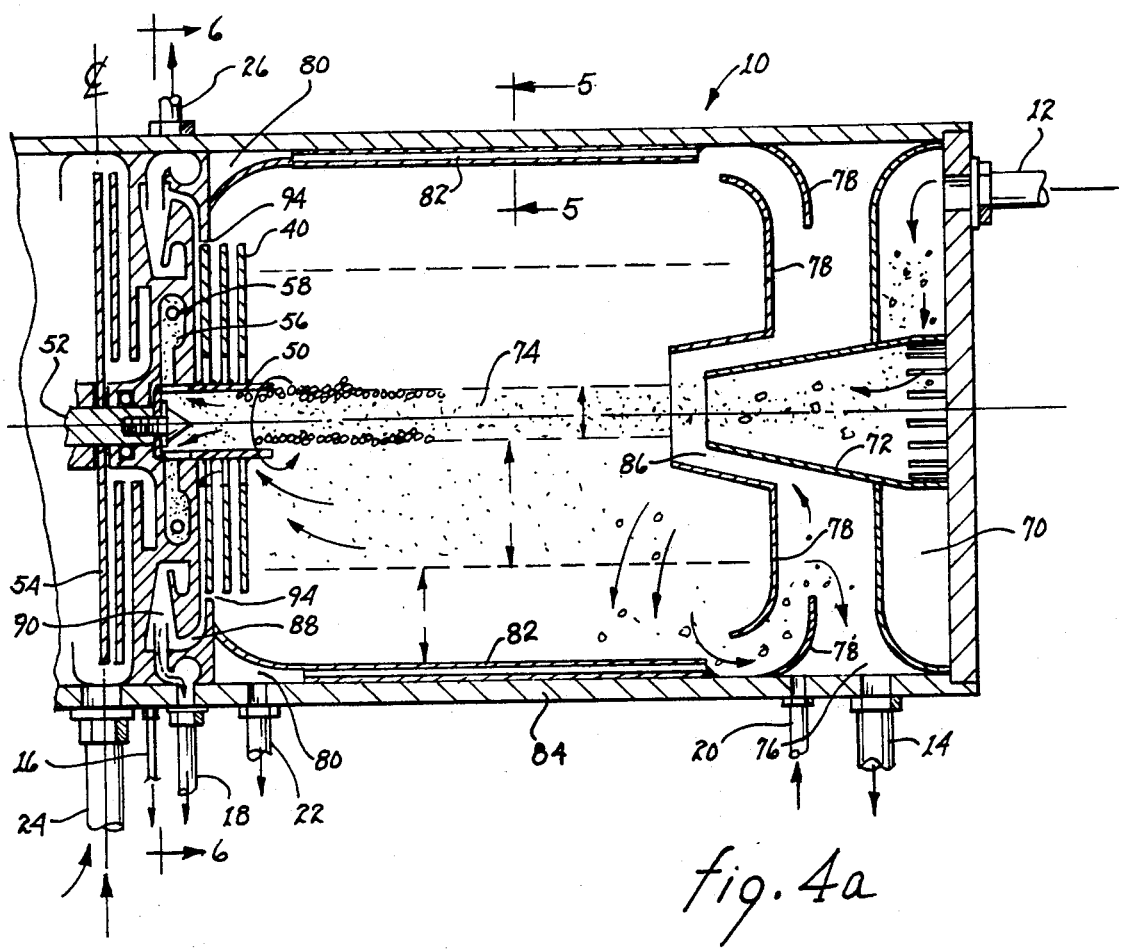
FIG. 4a illustrates a cross-sectional view of the scrubber according to this invention and a schematic diagram of the flow of the various components during operation.

Referring now to the drawings, wherein like parts are designated throughout with like numerals, FIG. 4a shows a cross-sectional view of a scrubber 10 that represents one way of implementing the principles described above. The scrubber consists generally of a self-contained cylindrical separation chamber wherein the entire process of soil reclamation occurs. A slurry of contaminated soil is introduced through an inlet port 12, and clean soil fractions are extracted from outlet ports 14 and 16. After separation from its solid components, the slurry fluid leaves the scrubber from port 18 and, if necessary, is added as make-up through port 20.

In the embodiment shown in FIG. 4a, the spinning motion of the slurry is generated by an assembly of annular disks 40 attached to a hollow shaft 50 connected to a rotating spindle 52. This spindle is propelled by the vanes of a turbine 54 powered by a stream of gas delivered to it through the inlet port 24. The gas exhausted from the turbine is channelled through a series of ducts (not shown in the drawings) and is used for gas sparging from the interior of the scrubber wall, as described in more detail below. The relatively light foam resulting from the aggregation of contaminant and very small soil particles with the gas aphrons released at the wall is collected into the interior of the shaft 50 and into a degassification chamber 56, where the gas is separated from the other phases for ultimate release through the outlet port 22. The contaminant and other small debris liberated during the degassification process are released from outlet port 26.

Describing more specifically the structural as well as the operational characteristics of the scrubber 10, the following example is used, wherein soil contaminated with diesel fuel is been reclaimed. A water slurry of contaminated soil, approximately a one to one ratio by weight, is created by spraying dry soil with pressurized water during agitation to break u the soil aggregate into its constituent particles. The slurry is screened to separate coarse particles (larger than approximately ¼ inch in diameter) which are virtually contaminant free and therefore need no scrubbing. These coarse particles can instead be readily cleaned of contaminant traces by simple skimming or comparable procedures. It is important to note that the larger particles in soil are constituted essentially of electrically neutral sand granules, while the smaller particles are negatively charged clays. Diesel fuel particles are positively charged and are, therefore, attracted to clays more than they are to sand.

The slurry containing intermediate and fine particles is then introduced through port 12 tangentially into a feed chamber 70 of the scrubber 10, where the attrition caused by its tangential velocity further contributes to its separation into component particles of various sizes. The slurry gradually passes through a collector 72, at the center of the feed chamber, and is directed toward the center of the scrubber which, at steady state, is filled with feed fluid spiraling in a vortex created by the rotation of the disks 40.

As will be apparent from the description that follows, at the center of the scrubber the core of the vortex is filled with a column of foam (shown as 74 in FIG. 4a) generated by gas sparging at the wall. As the slurry of contaminated soil enters the scrubber from the collector 72, it pushes the foam column 74 outwardly along the axis of the scrubber and through the interior of the shaft 50; at the same time, the slurry is engaged by and mixes with the whirlpool of liquid swirling around the center core. As the slurry begins moving in a spiral motion caught up in the existing vortex, its particles acquire a tangential velocity that subjects them to the separation forces described above and classification begins. The larger and heavier soil particles (greater than approximately 20 microns) rapidly migrate to the periphery of the vortex where they are directed to a product chamber 76 by channeling baffles 78, and finally exit the scrubber through port 14 as decontaminated soil. The outward motion of this heavy material is aided by the action of the rotating disks 50 which, in creating the liquid vortex, also impart to the fluid velocity components orthogonal to the plane of rotation, away from the disks on the outer edges of the vortex and toward the disks on the inside. As these larger soil particles leave the system, make-up water is added through port 20 to replace the void created by their discharge and to recycle residual fine particles in the slurry to the center of the vortex through the annular space 86 between the collector 72 and the baffle 78.

As illustrated in FIGS. 4a and 5, gas is sparged into the swirling slurry from a series of porous tubes 82 mounted in parallel to the scrubber's main axis along the inside of its wall 84. The gas, which is collected into an annular chamber 80 from the exhaust of the turbine 54, passes through the porous material of tubes 82 (sintered rubber, for example) and forms tiny bubbles that collide with and become attached to the contaminant particles (diesel fuel droplets), as well as to very fine soil particles (approximately less than one micron in diameter) and to various debris particles (such as wood chips) that tend to be impregnated with diesel fuel. The resulting aggregate of particles and gas constitutes a light foam that is rapidly displaced by the heavier fluid and solid material in the spiraling slurry, thus migrating to the core of the vortex to form the foam column 74. The formation of this foam is enhanced by the addition of a surfactant to the water slurry. As this foam is extracted from the separating chamber through the inside of the shaft 50, it is passed through the degassification chamber 56, where it is subjected to steps involving defoaming and phase separation to recover the individual components.

While these steps are well known generally in the art of froth flotation, specific methods must be adopted to suit the particular contaminant in the soil. In the case of this example, where approximately 100 part per million of a negatively charged surfactant (marketed by Formula Group Limited under the mark "Toxigon 2000") were used to combine with the diesel fuel, this phase separation is achieved by three distinct actions. Firstly, the abrasion of the foam bubbles against the chamber's walls tends to break them up to liberate the gas phase. Secondly, a vacuum applied at the discharge of the chamber to draw the gas out has the effect of causing the spontaneous enlargement and bursting of the bubbles. Thirdly, a positive static charge created by an electret is introduced to the foam stream in the chamber to counter the effects of the negatively charged surfactant. The result is the complete collapse of the foam and separation of the phases.

The diesel fuel obtained from this process is delivered at port 26 from a series of outlet ducts 58 in the degassification chamber 56. The diesel fuel so recovered is of recyclable quality inasmuch as it contains negligible impurities, mostly in the nature of soil particles that can be filtered out, if necessary. The gas phase produced in the chamber 56 is exhausted to the outlet port 22 through a series of connecting channels not shown in the drawings.

Figure 4B:
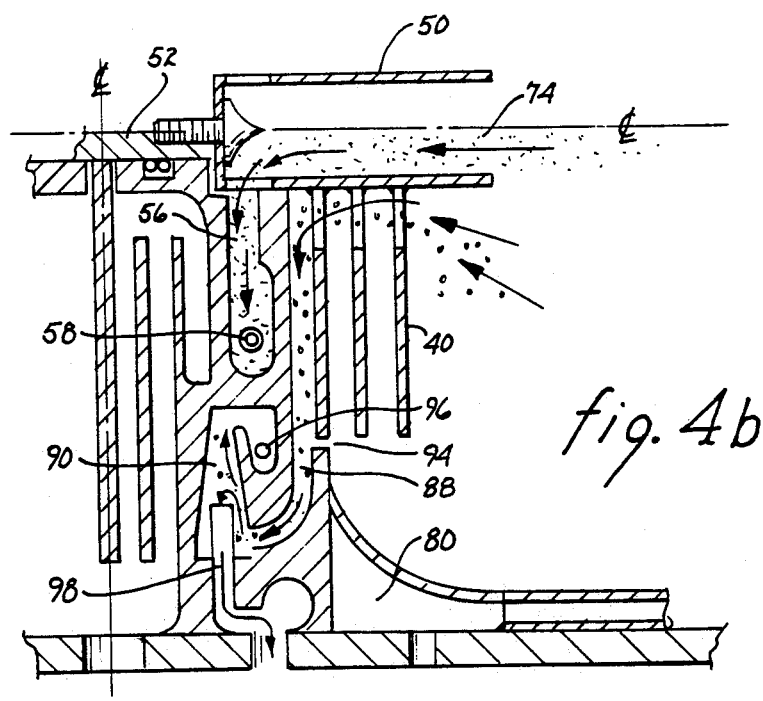
Figure 6:
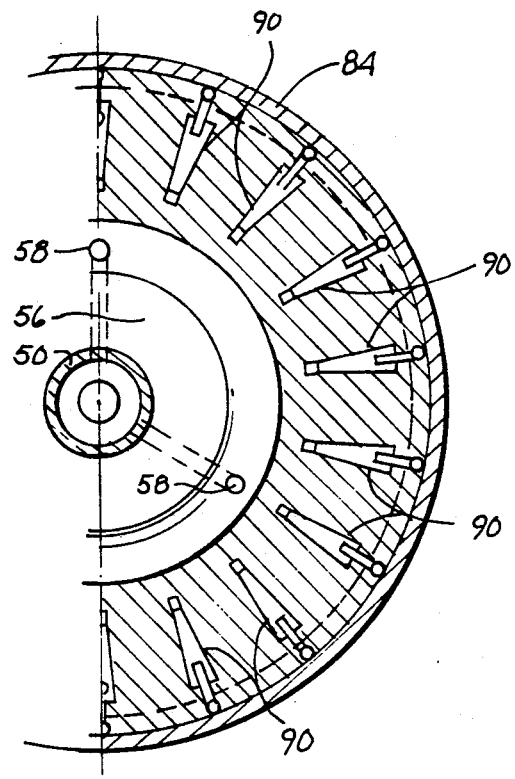
Figure 7:
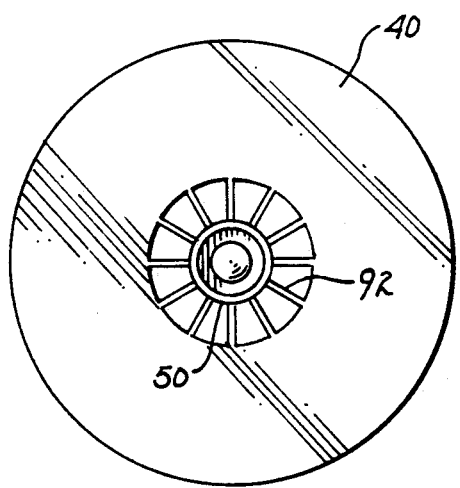
FIG. 7 is a view of one of the rotating disks used in the scrubber of this invention as seen along its axis of rotation.

The fraction of soil particles containing sizes between approximately one and twenty microns in diameter is too heavy to be entrained by the gas bubbles moving through the slurry and too light to migrate to the wall of the scrubber. Therefore, this fraction must be removed by other means in order to recover them and to avoid build-up in the slurry that would affect the efficiency of the scrubber. Thus, as particularly illustrated in FIG. 4b, a stream of slurry is drawn from the inner portion of the vortex into multiple channels 88 leading to individual stationary hydrocyclone chambers 90 distributed radially in the structure supporting the shaft 50 (see also FIG. 6). The geometry of the disks 4 and the shaft 50 insures that this stream is drawn only from the inner portion of the vortex. As shown in FIG. 7, each annular disk 40 is attached to the driving shaft 50 by a set on spokes 92. The open spaces between these spokes create a passage for the slurry to be drawn through as the disks rotate rapidly and spin the fluid radially toward the outside. The small annular opening 94 resulting from the tight tolerance in the fitting of the first disk within the structure of the scrubber insures that a portion of the slurry so drawn is fed into the channels 88. Since the shaft 50 extends into the slurry beyond the last disk, and since the diameter of the shaft is chosen to approximate the diameter of the foam column at steady state operation, virtually no gas is drawn with the slurry in this stream. Upon entering each hydrocyclone camber 90, the slurry is subjected to standard cyclone separation whereby the heavier soil particles are collected at the bottom of the cone and channelled to a common discharge port 16 from an outlet duct 96 (shown in FIG. 4b), and the water is discharged through an outlet duct 98 into the common outlet port 18. The soil fines so separated are contaminant free and can be combined with the larger fraction obtained from port 14. The water from port 18 contains no visually detectable solid particles and is, therefore, sufficiently clear to be recycled into the slurry of the system.

The scrubber illustrated in FIGS. 4a, 4b, 5, 6 and 7 is approximately 36 inches long and 10 inches in diameter. It is capable of a throughput of 150 tons per day of contaminated soil.

It requires a feed of approximately 33 gallons per minute of a one to one water/soil slurry and a gas rate of about one cubic foot per minute. It features three vortex generating disks (6 and ½ inches in diameter, with an inner 3 and ½ inch diameter spoked-core attached to a 2 and ¾ inch diameter shaft), rotating at approximately 3,200 rpm, and eighteen hydrocyclone chambers (approximately ¾ of one inch in diameter) for the recovery of fines. Under these operating conditions, it recovers nearly 100 percent of the contaminated soil in the feed and it produces clean soil particles with about ten percent moisture (the average moisture in the feed was about seven percent). The only unrecovered soil amounts to traces of clay particles, smaller than one micron in diameter, that are trapped with the diesel fuel. If desired, this recovery can be further improved by increasing the gas sparging rate. The scrubber also reclaims all the diesel fuel in the soil at a rate of about four gallons per hour in condition suitable for recycling.

Figure 2:
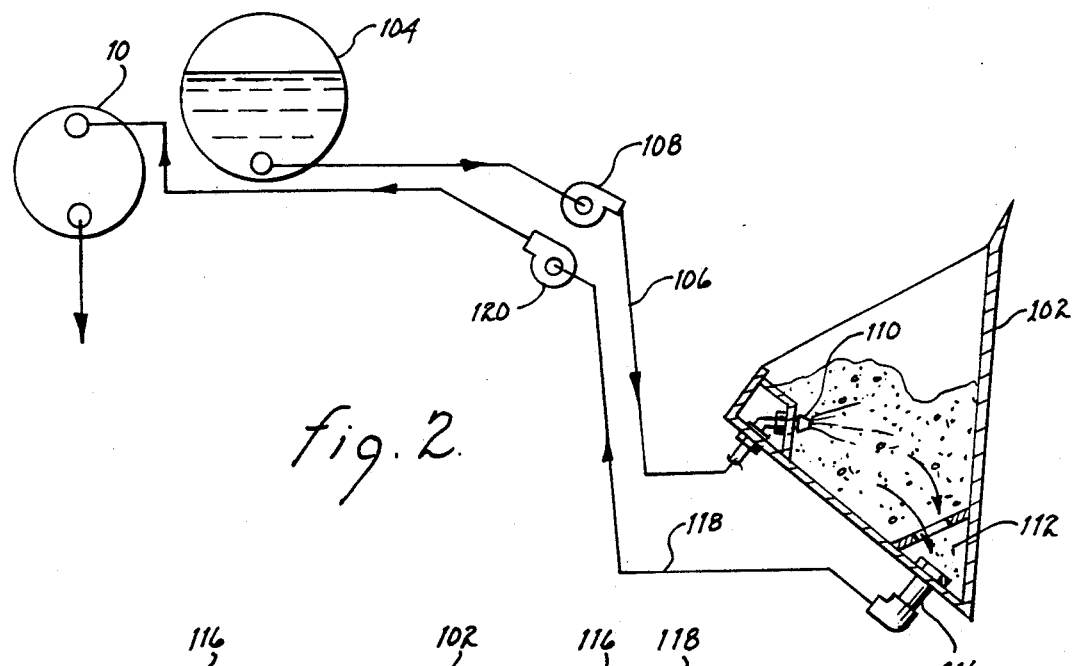
FIG. 2 illustrates a schematic diagram of the flow of fluid and slurry within the system shown in FIG. 1.
Figure 3:
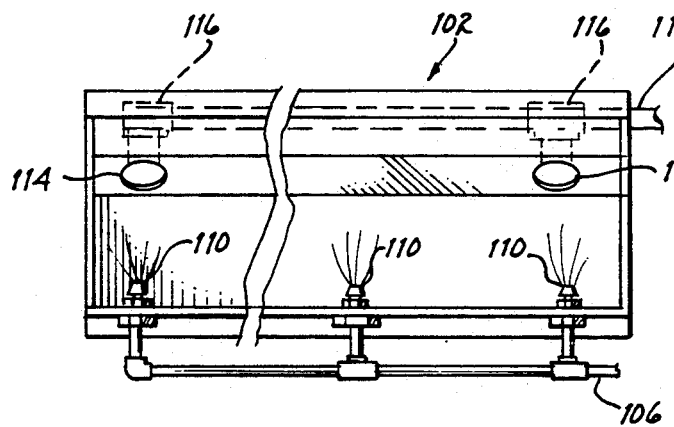
FIG. 3 shows a top view of the front end loader bucket illustrated in FIG. 1.

In the preferred embodiment of this invention, the scrubber 10 is combined with a diesel-powered front-end loader to provide a mobile, self-contained, apparatus for soil reclamation on site. As illustrated in FIG. 1, the typical front-end loader 100 is equipped with a loading bucket 102 that can also be used as a reservoir to generate the water slurry that is fed to the scrubber 10. Thus, the bucket 102 is connected to a 99 gallon water tank 104 through a flexible line 106 and a pump 108 (shown schematically in FIG. 2) that can deliver high pressure water (at approximately 230 psi) to the top of the bucket. As further illustrated in FIGS. 2 and 3, the water is sprayed through nozzles 110 over a load of soil scooped on site from the contaminated area and a slurry is formed by the scrubbing action of the water over the soil aggregate. The breaking up of the soil and the formation of the slurry is also aided by a vibration imparted to the bucket by a mechanical shaking mechanism. As the spray water entrains soil particles, it flows by gravity to an enclosed lower compartment 112 through a set of apertures 114 screened by ¼ inch screens (not shown in the drawings) to separate the coarse material from the slurry. From there, the slurry is picked up by the suction of a slurry pump 120 from outlet ducts 116 and delivered through a separate line 118 to the scrubber 10 at a pressure of about 75 psi. After processing in the scrubber as described above, the decontaminated soil can be dumped directly on the ground after collection from the outlet ports 14 and 16, as illustrated in FIG. 1, or it can be returned to the bucket 102 for temporary storage and placement to its desired destination. Of course, all lines in the system are appropriately flexible to accommodate the relative motion of the moving parts on the loader.

Although not visible from the drawings, in this embodiment of the invention the water produced from the scrubber at port 18 is returned to tank 104 and reused in the production of slurry. The tank is refilled periodically to replace the moisture lost with the reclaimed soil (generally once a day). The scrubber make-up water is delivered to the inlet port 20 from a line connected to the high pressure pump 108. The diesel fuel produced from the output port 26 is stored in a separate tank with sufficient capacity for 24 hours of operation.

In addition, this embodiment of the invention uses the exhaust gases from the diesel engine powering the front-end loader to drive the turbine 54 that operates the scrubber 10. By connecting the engine exhaust pipe to the inlet port 24, hot gases are released into the turbine vanes at a pressure of about 120 psi and drive the shaft 50 for the creation of the internal vortex that constitutes the basis of the process. The gas is exhausted from the turbine into the compartments 80, where it feeds the porous sparging tubes 82 along the interior of the scrubber wall 84. As a result of utilizing hot exhaust gases in the separation chamber, the operating temperature in the scrubber rises to about 85 degrees centigrade, which improves the scrubbing properties of the gas and therefore induces better contaminant separation. Upon collection of the gas foam from the core of the vortex through the interior of the shaft 50 and recovery of the diesel and other contaminants in the degassification chamber 56, the gas is exhausted from the port 22 and it is recycled into the system for further combustion by connecting it to the input manifold of the diesel engine which also creates the vacuum needed in the chamber.

Thus, the apparatus of this invention is completely self-contained for many hours of continuous operation. Through recycling and reuse of the water in the tank 104, the 99 gallon capacity insures 24 hours of operation without any need for refilling.

In order to provide additional reclamation capacity with the same equipment just described, two identical scrubbers 10 can be combined coaxially, in mirror image of one another, around a single turbine drive. Whether single or double, the scrubber operates well mounted in any position, although it is shown with a horizontal mount in the drawings.

It is also to be noted that a solvent could be used instead of water to create the slurry feed to the scrubber. Depending on the nature of the contaminant, the appropriate solvent could be chosen that would maximize soil and contaminant recovery. Moreover, chemical additives can be used either with water or other media to improve the efficiency of any step in the process. For example, we found that sodium hexametaphosphate enhances the action of Toxigon 2000. Similarly, the process could obviously be easily adapted to reclaim a slurry of any aggregate of contaminated material for which a suitable slurrying fluid can be found.

Finally, laboratory experiments have shown that the scrubber of this invention can be scaled up considerably without loss of efficiency. The relationship between the various dimensions could be varied to optimize performance, but tests with linear scaling show that an apparatus five feet in diameter would be capable of processing about 800 tons of contaminated soil per hour.

Therefore, while the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus and methods.

What we claim is:

1. An apparatus for removing toxic material from contaminated material by gas sparged centrifugal techniques comprising, in combination:

cylindrical separation chamber means for containing a slurry of the contaminated material;

coaxially rotating disks means located coaxially within said cylindrical separation chamber means for rotating along the axis of said cylindrical separation chamber means;

means coupling to said coaxially rotating disks means for rotating said coaxially rotating disks means to create a vortex within said cylindrical separation chamber means thereby subjecting said slurry to centrifugal classification, said centrifugal classification causing relatively heavier material particles in said slurry to accumulate and exit the chamber tangentially along the outer edge of said vortex and relatively lighter material and toxic material in said slurry to accumulate and exit the chamber axially along the center of said vortex;

means to feed said slurry of the contaminated material into the center of said vortex;

gas sparging means for sparging a stream of gas into said vortex from a stationary wall of said cylindrical separation chamber means thereby creating boundary layer turbulence to increase particle dispersion and improve the flotation characteristics of the slurry to obtain more rapid separation of lighter material and toxic material entrained in the gas phase from relatively heavier material particles;

means for isolating said lighter material and toxic material collected in gaseous suspension from the center of said vortex from the gas phase in which they are entrained; and means for isolating said heavier material from the outer edge of the vortex.

2. The apparatus described in claim 1, wherein said means to feed said slurry comprises:

an annular feed chamber means axially connected to said material is fed tangentially into said annular feed chamber means to create turbulence and attrition for maximum dispersion and friction separation of the various particles, and wherein the slurry is then fed through the center of said annular feed chamber means to the center of said vortex.

3. The apparatus described in claim 2, further comprising:

a toxic material tank for collecting and storing the toxic materials recovered from said cylindrical separation chamber means.

4. The apparatus described in claim 1, further comprising:

a material reservoir means for receiving batches of toxic material, wherein liquid from a liquid tank is added to form said slurry of contaminated material.

5. The apparatus described in claim 4, further comprising:

means for circulating the liquid from said liquid tank into said material reservoir means to mix with said contaminated material and form said slurry, means for causing said slurry to flow from said material reservoir means to said cylindrical separation chamber, means for recirculating said liquid phase to said liquid tank, and for returning said decontaminated material to said material reservoir means.

6. The apparatus described in claim 5, further comprising:

a vehicle upon which said chamber means, said tank and said material reservoir means is mounted for mobility and for self-contained site operation.

7. The apparatus described in claim 6, wherein said vehicle is a front-end loader and said material reservoir means is its loading bucket.

8. The apparatus described in claim 7, wherein said front-end loader is powered by a diesel engine.

9. The apparatus described in claim 8, wherein said means to rotate said disks means comprises a turbine, means to channel exhaust gas from said diesel engine to said turbine for powering said turbine, means to channel said exhaust gas from the turbine to the gas sparging means for sparging gas into the vortex.

10. An apparatus for removing toxic material from contaminated soil comprising, in combination:

cylindrical separation chamber means for containing a slurry of the contaminated material;

coaxially rotating disks means located coaxially within said cylindrical separation chamber means for rotating along the axis of said cylindrical separation chamber means;

means for rotating said disks means for creating a vortex within said cylindrical separation chamber means thereby subjecting said slurry to centrifugal classification, said centrifugal classification causing relatively heavier soil particles in said slurry to accumulate along the outer edge of said vortex and relatively lighter soil and toxic material in said slurry to accumulate axially along the center of the vortex;

inner cylindrical duct means coupled to said disks means and protruding axially through said disks means for receiving relatively lighter soil and toxic material that has accumulated along the center of the vortex;

gas sparging means for sparging a stream of gas into said vortex from a stationary wall of said cylindrical separation chamber means thereby creating boundary layer turbulence to increase particle dispersion and improve the flotation characteristics of the slurry to obtain more rapid separation of lighter material and toxic material entrained in the gas phase from relatively heavier soil particles;

stationary degassing chamber means coupled to said rotating inner cylindrical duct means for separating said gaseous suspension into a liquid contaminant phase, containing a relatively lighter soil solid phase, and a gas phase, and wherefrom each phase is recovered outside said cylindrical separation chamber means;

means to feed said slurry into the cylindrical separation chamber;

baffle means mounted inside said cylindrical separation chamber means for directing the feed of said slurry of contaminated soil toward the center of said vortex thereby forming a solid accumulation space in the proximity of the point of discharge of said relatively heavier soil particles from the outer edge of said vortex towards said accumulation space for concentration and tangential discharge;

a plurality of radial compartment means for collecting intermediate weight soil particles suspended in an intermediate portion of said vortex through the annular space between said inner cylindrical duct means and said coaxially rotating disks means, each of said radial compartment means comprising a hydrocyclone structure for separating said intermediate weight soil particles from the liquid phase in which they are suspended, and further comprising discharge channels for the recovery of said intermediate weight soil particles and said liquid phase; and said means to feed said slurry comprises an annular feed chamber means which is axially coupled to said cylindrical separation chamber means for feeding the slurry axially to the center of the vortex;

means to isolate said heavier soil form the outer edge of the vortex.

11. The apparatus described in claim 10, further comprising:

a toxic material tank for collecting and storing the toxic material recovered in said cylindrical separation chamber means.

12. The apparatus described in claim 11, further comprising:

a liquid tank for collecting and storing the liquid used to generate said slurry and the liquid recovered from the separation of the solid soil from the slurry in said cylindrical separation chamber means.

13. The apparatus described in claim 12, further comprising:

a soil reservoir means for receiving batches of contaminated solid, means for injecting the liquid from the liquid tank into the reservoir means to form said slurry of contaminated soil.

14. The apparatus described in claim 13, wherein said means for injecting the liquid comprises a first pump and plumbing means, means for causing said slurry to flow from said reservoir means to the cylindrical separation chamber means which comprises a second pump and second plumbing means, and means for recirculating said liquid phase to the liquid tank comprising a third pump and third plumbing means; and means for returning said decontaminated soil to said soil reservoir means.

15. The apparatus described in claim 14, further comprising:

a front-end loader upon which said chamber means, said liquid tank and said reservoir means are mounted for mobility and for self-contained site operation.

16. The apparatus described in claim 15, wherein said soil reservoir means is the loading bucket of said front-end loader.

17. The apparatus described in claim 16, wherein said front-end loader is powered by a diesel engine.

18. The apparatus described in claim 17, wherein the means for rotating said disks means comprises a turbine, means to channel exhaust gas from said diesel engine to said turbine to power said turbine, means to move said gas from said turbine to the gas sparging means.

19. The apparatus described in claim 18, wherein said plurality of radial compartments consist of eighteen equal units distributed evenly around the axis of said cylindrical separation chamber means.

20. The apparatus described in claim 19, wherein two identical cylindrical separation chamber means are combined coaxially, in mirror image of one another, and are driven by a single turbine mounted between and in symmetrical relationship to said cylindrical separation chamber means.

21. An apparatus for removing certain material from a combination of materials by gas sparged centrifugal techniques comprising, in combination:

cylindrical separation chamber means for containing a slurry of the combination of material;

coaxially rotating disks means located coaxially within said cylindrical separation chamber means for rotating along the axis of said cylindrical separation chamber means;

means coupled to said coaxially rotating disks means for rotating said coaxially rotation disks means to create a vortex within said cylindrical separation chamber means thereby subjecting said slurry to centrifugal classification, said centrifugal classification causing relatively heavier material particles in said slurry to accumulate and exit the chamber tangentially along the outer edge of the vortex and relatively lighter material in said slurry to accumulate and exit the chamber axially along the center of the vortex;

means to feed said slurry of the combination of materials into the center of the vortex;

gas sparging means for sparging a stream of gas into said vortex from a stationary wall of said cylindrical separation chamber means thereby creating boundry layer turbulence to increase particle dispersion and improve the flotation characteristics of the slurry to obtain more rapid separation of lighter material entrained in the gas phrase form relatively heavier material particles;

means for isolating said lighter material collected in gaseous suspension from the center of the vortex from the gas phase in which they are entrained; and means for isolating said heavier material form the outer edge of the vortex.

* * * * *